(No Model.)

W. F. WHITON.
THILL COUPLING.

No. 476,345. Patented June 7, 1892.

UNITED STATES PATENT OFFICE.

WALTER F. WHITON, OF BANGOR, MAINE, ASSIGNOR OF ONE-FOURTH TO JOHN R. MASON, OF SAME PLACE.

THILL-COUPLING.

SPECIFICATION forming part of Letters Patent No. 476,345, dated June 7, 1892.

Application filed February 3, 1892. Serial No. 420,156. (No model.)

*To all whom it may concern:*

Be it known that I, WALTER F. WHITON, a citizen of the United States, residing at Bangor, in the county of Penobscot and State of Maine, have invented certain new and useful Improvements in Non-Rattling Thill-Couplers; and I do hereby declare the following to be a full, clear, and exact description of the invention, such as will enable others skilled in the art to which it appertains to make and use the same.

My invention consists of an improved non-rattling coupler for the thills or poles of vehicles, and is fully illustrated in the accompanying drawings, in which—

Figure 1:
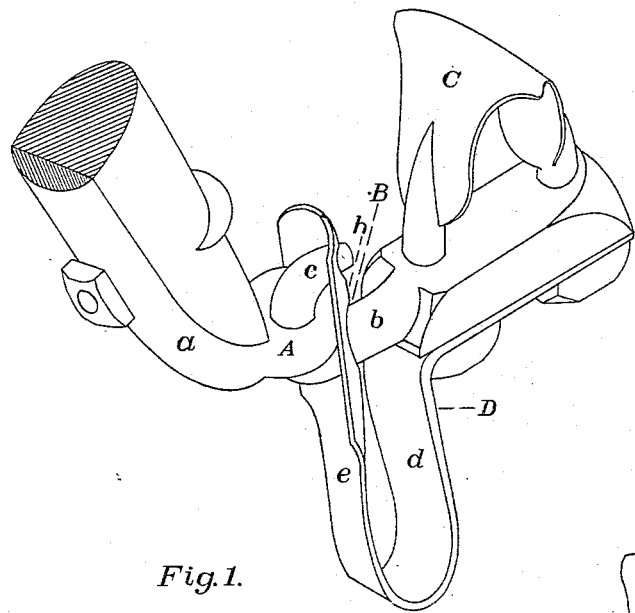
Figure 3:
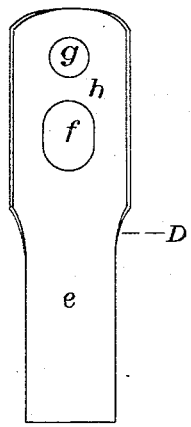
Figure 2:
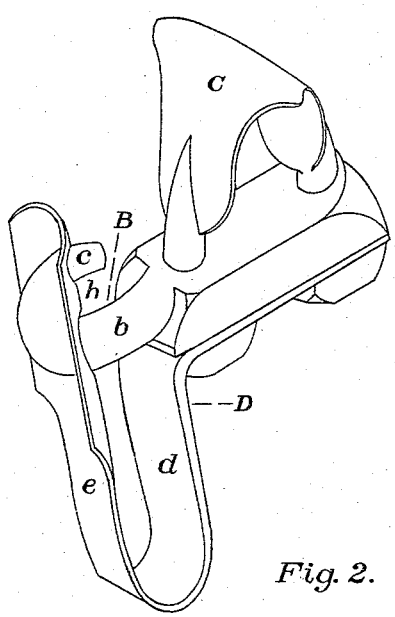

Figure 1 is a perspective view of the coupler coupled. Fig. 2 is a perspective view of spring and hook when uncoupled. Fig. 3 is an elevation of front half of spring.

Similar letters refer to corresponding parts throughout the figures.

I provide a thill-iron $a$, terminating in an eye A, and an axle-clip C, having a forwardly-projecting hook B formed to engage with said eye. I also provide a U-shaped spring D, having its rear arm $d$ bent backward at substantially a right angle and adapted to be bolted under the axle to the base of the clip C. The forward and free arm $e$ of the spring is fitted with two slots or holes $f\,g$, so placed as respectively to receive the shank $b$ of the hook B and the point $c$ of said hook and leaving the wall or stop $h$ between said slots. The hook B is preferably formed, as shown, with a shank furnished with bolt-holes so placed as to receive the ends of the clip, and the point $c$ of the hook B being passed first through the slot $f$ and then through the slot $g$ of the spring D the ends of the clip C are inserted through the bolt-holes in the shank of the hook and the backwardly-bent rear arm of the spring D and the whole firmly secured to the axle by nuts. The stop $h$ now rests and presses upon the inner surface of the bend of the hook B, and the forward arm of the spring extends slightly above the top of the point $c$ of the hook B and is laterally curved inward to conform to the shape of the eye A. This inward curve of the free end $e$ of the spring, conforming to the shape of the eye A, not only serves to guide the eye A into the hook B when the coupling is performed, but also serves to prevent lateral motion of the eye when coupled with the hook, and thus assists in the prevention of rattling.

In operation, the hook, spring, and clip being bolted to the axle, as described, or secured thereto in any convenient manner, the thills are raised until the cross-bar rests against the dasher of the vehicle, the eyes A resting upon the tops of the hooks B and against the inwardly-curved upper extremities of the springs D. A slight pull upon the curved rear ends of the thills contracts and retracts the springs D and permits the points $c$ of the hooks B to pass out of the slots $g$ in the springs, when the eyes A drop into the bends or jaws of the hooks B. The springs D are instantly relaxed and move forward until the stops $h$ rest and press upon the eyes A, thus locking the hooks and eyes and by their constant pressure preventing all rattling of the hook-and-eye couplings.

The uncoupling is effected by simply raising the thills as before and pulling upon them backward and upward.

It will be apparent that this coupler is equally applicable to both thills and poles of vehicles, that properly constructed all rattling of the coupler is prevented, that it cannot be accidentally uncoupled and the use of safety-straps is rendered largely unnecessary, and that the coupling and uncoupling can be accomplished in a small fraction of the time required where the screw-bolt is used as commonly, this latter feature being of especial advantage where, as in livery-stables, frequent changes from thills to poles are necessary.

I do not claim a hook-and-eye coupler for the thills or poles of vehicles or for any other purpose; but,

Having thus described my invention, what I claim, and desire to secure by Letters Patent, is—

1. A hook-and-eye coupler, in combination with a spring having a free arm slotted to receive the point and shank of the hook and having a stop between said slots.

2. A thill or pole coupler consisting of the combination of a hook, an eye, and a spring having two slots in its free arm and a stop between said slots, said slots being so located as to admit and receive the point and shank of said hook.

3. A thill or pole coupler consisting of the combination of an eye attached to the rear end of the thill, a hook attached to the axle or axle-clip, and a spring having its rear end fixed to the axle or axle-clip and in its free end two slots and a stop between said slots, said slots being so located as to admit and receive the point and shank of said hook.

4. In a hook-and-eye thill-coupler, the U-shaped spring D, having two slots in its free end and a stop between said slots.

5. In a hook-and-eye thill-coupler, the combination of a hook, an eye, and a U-shaped spring having two slots in its free end and having the upper extremity of its free end laterally curved inward.

WALTER F. WHITON.

In presence of—
F. M. LAUGHTON,
G. M. McALLISTER.